(12) United States Patent
Finseth et al.

(10) Patent No.: US 7,334,247 B1
(45) Date of Patent: Feb. 19, 2008

(54) METHOD AND APPARATUS FOR WATERMARKING RECEIVED TELEVISION CONTENT

(75) Inventors: Craig A. Finseth, St. Paul, MN (US); Jeffrey A. Brown, Roseville, MN (US); Philip E. Hsiao, Eden Prairie, MN (US)

(73) Assignee: The DIRECTV Group, Inc., El Segundo, CA (US)

( * ) Notice: Subject to any disclaimer, the term of this patent is extended or adjusted under 35 U.S.C. 154(b) by 498 days.

(21) Appl. No.: 09/536,101

(22) Filed: Mar. 24, 2000

Related U.S. Application Data

(60) Provisional application No. 60/126,695, filed on Mar. 29, 1999.

(51) Int. Cl.
```
H04N 9/00      (2006.01)
H04N 7/16      (2006.01)
H04N 5/445     (2006.01)
G06F 3/00      (2006.01)
G06F 13/00     (2006.01)
```
(52) U.S. Cl. .......................... 725/21; 725/46
(58) Field of Classification Search ............... 725/46, 725/32, 34, 19–21; 713/176; 348/569
See application file for complete search history.

(56) References Cited

U.S. PATENT DOCUMENTS

| | | | |
|---|---|---|---|
| 5,519,778 A * | 5/1996 | Leighton et al. ............... 380/30 |
| 5,530,759 A * | 6/1996 | Braudaway et al. .......... 380/54 |
| 6,137,952 A * | 10/2000 | Hogan .......................... 386/94 |
| 6,263,438 B1 * | 7/2001 | Walker et al. ............... 713/178 |
| 6,311,271 B1 * | 10/2001 | Gennaro et al. ............ 713/170 |
| 6,373,960 B1 * | 4/2002 | Conover et al. ............ 382/100 |
| 6,389,538 B1 * | 5/2002 | Gruse et al. ................. 713/194 |
| 6,615,408 B1 * | 9/2003 | Kaiser et al. ................ 725/112 |
| 6,674,858 B1 * | 1/2004 | Kimura et al. .............. 380/202 |
| 6,714,659 B2 * | 3/2004 | Linnartz ..................... 382/100 |
| 2001/0013097 A1 * | 8/2001 | Ito et al. ..................... 713/176 |
| 2001/0013124 A1 * | 8/2001 | Klosterman et al. .......... 725/36 |
| 2002/0095579 A1 * | 7/2002 | Yoshiura et al. ............. 713/176 |
| 2003/0011684 A1 * | 1/2003 | Narayanaswami et al. ....... 348/207.99 |
| 2003/0159043 A1 * | 8/2003 | Epstein ....................... 713/176 |

* cited by examiner

Primary Examiner—Hunter B Lonsberry

(57) ABSTRACT

A method and apparatus for inserting receiver identification codes into video images received from a television broadcasting station are disclosed. The apparatus comprises a receiver with a tuner for receiving a plurality of television channels and outputting a first television channel. A buffer is coupled to the tuner for storing a first image frame from the first television channel. The first image frame includes a multiplicity of pixel data. A memory stores identification data that provides a unique identification of the receiver. A controller is coupled to the buffer and the memory. The controller retrieves identification data from the memory and changes values of the pixel data to values of the identification data, thereby embedding the identification data into the first image frame. A display generator generates a display of the first television channel including the first image frame.

58 Claims, 4 Drawing Sheets

US 7,334,247 B1

METHOD AND APPARATUS FOR WATERMARKING RECEIVED TELEVISION CONTENT

CROSS-REFERENCE TO RELATED APPLICATIONS

This application claims the benefit of U.S. Provisional Patent Application Ser. No. 60/126,695, by Craig A. Finseth, Jeffrey A. Brown, and Philip E. Hsiao, filed Mar. 29, 1999, and entitled "METHOD AND APPARATUS FOR WATERMARKING RECEIVED TELEVISION CONTENT," which application is hereby incorporated by reference herein.

BACKGROUND OF THE INVENTION

1. Field of the Invention

The present invention relates to a method and apparatus for embedding data into video images, and more particularly to a method and apparatus for inserting receiver identification codes into video images received from a television broadcasting station.

2. Description of the Related Art

Watermarking is a process by which electronically transmitted images are encoded with identification data so that the images can later be traced back to their originator. The encoded identification data is referred to as a "watermark". The identification data may include the originator's name, a company name, an address, or any other information that provides a unique identification. Typically, the identification data are embedded into an image by manipulating color information of the image. The identification data is embedded in the images in such a way as to be undetectable to the casual observer. In other words, the image appears the same as it would with no watermark embedded therein.

Some watermarking techniques have been used in the context of the World Wide Web. By using watermarked images, World Wide Web content providers can more easily determine if someone has borrowed their images and used them in another context. Similarly, there have been discussions about networks like HBO doing watermarking on a network layer or broadcaster layer such that DIRECTV, for instance, would have one watermark, TCI Cable would have a different watermark, DISH NETWORK would have a third watermark, etc. However, such techniques do not provide for watermarking on a receiver-by-receiver basis. Thus, one would be able to determine that a particular signal originated from a DIRECTV/HBO feed, for example, but would not be able to trace the signal to a particular receiver.

SUMMARY OF THE INVENTION

The present invention is a method and apparatus for inserting receiver identification codes into video images received from a television broadcasting station. Receiver identification codes include any data that uniquely identifies a television receiver, such as a receiver serial number; a name, address or phone number of an owner of the receiver; and a name of the manufacturer of the receiver and/or a model name of the receiver.

The invention comprises a receiver with a tuner for receiving a plurality of television channels and outputting a first television channel. A buffer is coupled to the tuner for storing a first image frame from the first television channel. The first image frame includes a multiplicity of pixel data. A memory stores identification data that provides a unique identification of the receiver. A controller is coupled to the buffer and the memory. The controller retrieves identification data from the memory and changes values of the pixel data to values of the identification data, thereby embedding the identification data into the first image frame. A display generator generates a display of the first television channel including the first image frame.

In a preferred embodiment, the controller embeds identification data into program guide images prior to their display on a user's television.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Transmission of Television Content and Program Guide Data

Figure 1:
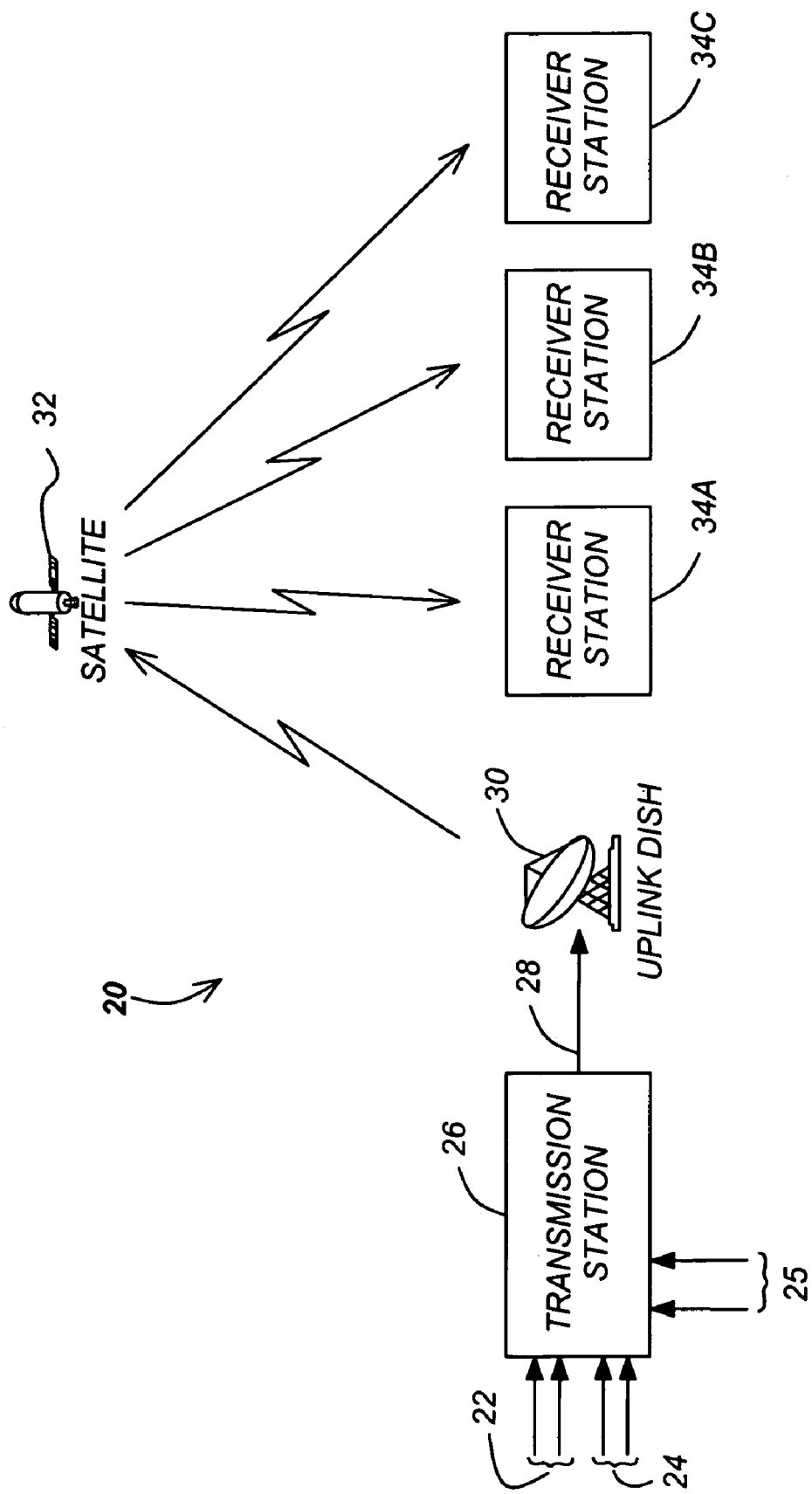
FIG. 1 is a block diagram of a television broadcasting system for the transmission, receipt and display of television content and electronic program guide data.

FIG. 1 is a block diagram of television broadcasting system 20, which transmits and receives audio, video and data signals via satellite. Although the present invention is described in the context of a satellite-based television broadcasting system, the techniques described herein are equally applicable to other methods of program content delivery, such as terrestrial over-the-air systems, cable-based systems, and the Internet. Further, while the present invention will be described primarily with respect to television content (i.e. audio and video content), the present invention can be practiced with a wide variety of program content material, including television content, audio content, or data content.

Television broadcasting system 20 includes transmission station 26, uplink dish 30, satellite 32, and receiver stations 34A-34C (collectively referred to as receiver stations 34). Transmission station 26 includes a plurality of input lines 22 for receiving various signals, such as analog television signals, digital television signals, video tape signals, original programming signals and computer generated signals containing HTML content. Additionally, input lines 22 receive signals from digital video servers having hard discs or other digital storage media. Transmission station 26 also includes a plurality of schedule feeds 24, which provide electronic schedule information about the timing and content of various television channels, such as that found in television schedules contained in newspapers and television guides. Transmission station 26 converts the data from schedule feeds 24 into program guide data. Program guide data may also be manually entered at the site of transmission station 26. The program guide data consists of a plurality of "objects". The program guide data objects include data for constructing an electronic program guide that is ultimately displayed on a user's television.

Transmission station 26 receives and processes the various input signals received on input lines 22 and schedule feeds 24, converts the received signals into a standard form, combines the standard signals into a single output data stream 28, and continuously sends output data stream 28 to uplink dish 30. Output data stream 28 is a digital data stream that is compressed using MPEG2 encoding, although other compression schemes may be used. The digital data in output data stream 28 are divided into a plurality of packets, with each such packet marked with a service channel identification (SCID) number. The SCIDs are later used by receiver 64 (shown in FIG. 2) to identify the packets that correspond to each television channel. Error correction data is also included in output data stream 28.

Output data stream 28 is a multiplexed signal that is modulated by transmission station 26 using standard frequency and polarization modulation techniques. Output data stream 28 preferably includes 16 frequency bands, with each frequency band being either left polarized or right polarized.

Uplink dish 30 continuously receives output data stream 28 from transmission station 26, amplifies the received signal and transmits the signal to satellite 32. Although a single uplink dish and satellite are shown in FIG. 1, multiple dishes and satellites are preferably used to provide additional bandwidth, and to help ensure continuous delivery of signals.

Satellite 32 revolves in geosynchronous orbit about the earth. Satellite 32 includes a plurality of transponders that receive signals transmitted by uplink dish 30, amplify the received signals, frequency shift the received signals to higher frequency bands, and then transmit the amplified, frequency shifted signals back to receiver stations 34. A total of 32 transponders are preferably used in the present invention. Since there are 32 transponders in the preferred embodiment, each of the 16 frequency bands in output data stream 28 is shared by two transponders. Therefore, transponder 1 is assigned frequency 1, left polarization; transponder 2 is assigned frequency 1, right polarization; transponder 3 is assigned frequency 2, left polarization, etc.

Receiver stations 34 receive and process the signals transmitted by satellite 32. Receiver stations 34 are described in further detail below with respect to FIG. 2.

Receipt and Processing of Broadcast Television Content and Program Guide Data

Figure 2:
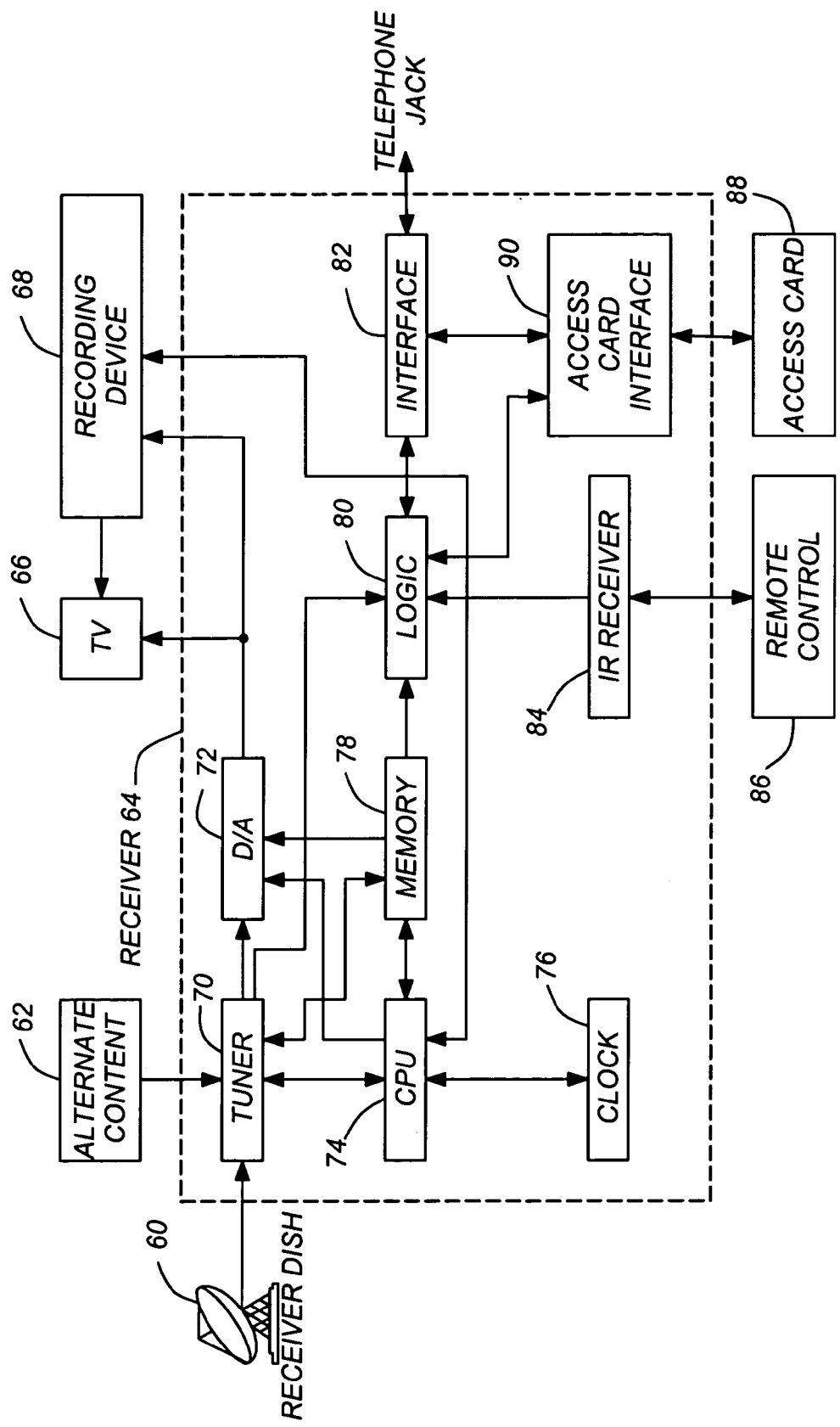
FIG. 2 is a block diagram of a receiver station for receiving and decoding audio, video and data signals.

FIG. 2 is a block diagram of one of receiver stations 34, which receives and decodes audio, video and data signals. Receiver station 34 includes receiver dish 60, alternate content source 62, receiver 64, television 66, recording device 68, remote control 86 and access card 88. Receiver 64 includes tuner 70, digital-to-analog (D/A) converter 72, CPU 74, clock 76, memory 78, logic circuit 80, interface 82, infrared (IR) receiver 84 and access card interface 90.

Receiver dish 60 receives signals sent by satellite 32, amplifies the signals and passes the signals on to tuner 70. Tuner 70 operates under control of CPU 74. Tuner 70 is preferably two separate tuners; a first tuner for tuning to digital satellite broadcasted (DSAT) and ATSC channels, and a second tuner for tuning to analog NTSC channels.

The CPU 74 operates under control of an operating system stored in the memory 78 or within an auxiliary memory within the CPU 74. The functions performed by CPU 74 are controlled by one or more control programs or applications stored in memory 78. Operating system and applications are comprised of instructions which, when read and executed by the CPU 74, cause the receiver 64 to perform the functions and steps necessary to implement and/or use the present invention, typically, by accessing and manipulating data stored in the memory 78. Instructions implementing such applications are tangibly embodied in a computer-readable medium, such as the memory 78 or the access card 88. The CPU 74 may also communicate with other devices through interface 82 or the receiver dish 60 to accept commands or instructions to be stored in the memory 78, thereby making a computer program product or article of manufacture according to the invention. As such, the terms "article of manufacture," "program storage device" and "computer program product" as used herein are intended to encompass any application accessible by the CPU 74 from any computer readable device or media.

Memory 78 and access card 88 store a variety of parameters for receiver 64, such as a list of channels receiver 64 is authorized to process and generate displays for; the zip code and area code for the area in which receiver 64 is used; the model name or number of receiver 64; a serial number of receiver 64; a serial number of access card 88; the name, address and phone number of the owner of receiver 64; and the name of the manufacturer of receiver 64.

Access card 88 is removable from receiver 64 (as shown in FIG. 2). When inserted into receiver 64, access card 88 is coupled to access card interface 90, which communicates via interface 82 to a customer service center (not pictured). Access card 88 receives access authorization information from the customer service center based on a user's particular account information. In addition, access card 88 and the customer service center communicate regarding billing and ordering of services.

Clock 76 provides the current local time to CPU 74. Interface 82 is preferably coupled to a telephone jack at the site of receiver station 34. Interface 82 allows receiver 64 to communicate with transmission station 26 via telephone lines. Interface 82 may also be used to transfer data to and from a network, such as the Internet.

The signals sent from receiver dish 60 to tuner 70 are digital signals that are grouped into a plurality of packets. Each packet includes a header that identifies the SCID number for the packet, and the type of data contained in the packet (e.g., audio data, video data, or program guide data). Tuner 70 includes multiple output lines for transmitting video data, audio data and program guide data. As packets are received from receiver dish 60, tuner 70 identifies the type of each packet and outputs each packet on the appropriate output line, as discussed in more detail below. If tuner 70 identifies a packet as program guide data, tuner 70 outputs the packet to memory 78. Program guide data are stored in a guide database in memory 78.

In addition to the digital satellite signals received by receiver dish 60, other sources of television content are also preferably used. For example, alternate content source 62 provides additional television content to television 66. Alternate content source 62 is coupled to tuner 70. Alternate content source 62 can be an antenna for receiving off the air signals NTSC signals, a cable for receiving ATSC signals, or other content source. Although only one alternate content source 62 is shown, multiple sources can be used.

Initially, as data enters receiver 64, tuner 70 looks for a boot object. Boot objects are always transmitted with the same SCID, so tuner 70 knows that it must look for packets marked with that SCID. A boot object identifies the SCIDs where all other program guide objects can be found. The information from the boot object is used by tuner 70 to identify packets of program guide data and route them to memory 78.

Remote control 86 emits infrared signals that are received by infrared (IR) receiver 84 in receiver 64. Other types of data entry devices may alternatively be used, such as an ultra-high frequency (UHF) remote control, a keypad on receiver 64, a remote keyboard and a remote mouse. When a user requests the display of a program guide by pressing the "guide" button on remote control 86, a guide request signal is received by IR receiver 84 (shown in FIG. 2) and transmitted to logic circuit 80. Logic circuit 80 informs CPU 74 of the guide request. In response to the guide request, CPU 74 causes memory 78 to transfer a program guide digital image to D/A converter 72. D/A converter 72 converts the program guide digital image into a standard analog television signal, which is then transmitted to television 66. Television 66 then displays the program guide. Television 66 may alternatively be a digital television, in which case no digital to analog conversion is necessary.

Users interact with the electronic program guide using remote control 86. Examples of user interactions include selecting a particular channel or requesting additional guide information. When a user selects a channel using remote control 86, IR receiver 84 relays the user's selection to logic circuit 80, which then passes the selection on to memory 78 where it is accessed by CPU 74. CPU 74 instructs tuner 70 to output the audio and video packets for the selected channel to D/A converter 72. D/A converter 72 performs an MPEG2 decoding step on received packets, converts the packets to analog signals, and outputs the analog signals to television 66. In addition, television image frames are watermarked as they pass through D/A converter 72.

Figure 3:
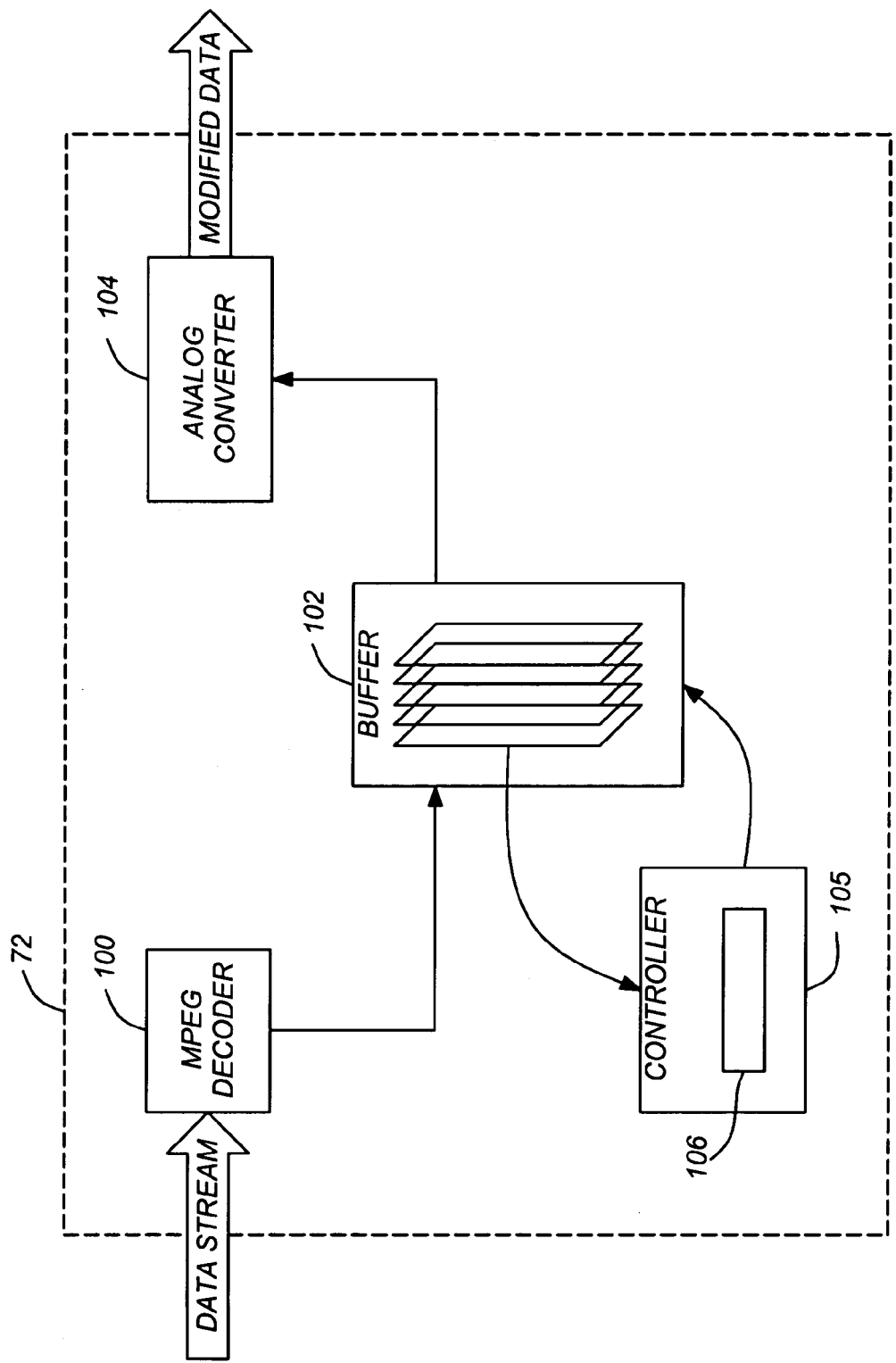
FIG. 3 is a more detailed block diagram of the digital-to-analog converter shown in FIG. 2.

FIG. 3 shows a more detailed block diagram of D/A converter 72. D/A converter 72 includes MPEG decoder 100, buffer 102 and analog converter 104. A controller 105 contributing to the implementation of a watermarking algorithm 106 is also shown in FIG. 3, and is discussed in detail below with respect to FIG. 4. D/A converter 72 performs more functions than merely converting a digital signal to an analog signal. MPEG decoder 100 receives a data stream from tuner 70 (shown in FIG. 2) and performs an MPEG2 decoding operation on the received data. The data stream received from tuner 70 represents the content of the television channel currently tuned to by tuner 70. MPEG decoder 100 outputs a sequence of image frames to buffer 102. The image frames output by MPEG decoder 100 represent frames of television content. If the data stream from tuner 70 is an analog NTSC signal, MPEG decoder 100 passes image frames directly to buffer 102 without performing an MPEG2 decoding operation. While image frames are stored in buffer 102, CPU 74 "grabs" an image frame from buffer 102 and transfers the image frame to memory 78 (shown in FIG. 2). While the image frame is stored in memory 78, CPU 74 performs a watermarking algorithm on the image frame. A watermarking algorithm is represented by functional block 106 in FIG. 3. A preferred watermarking algorithm is also shown in more detail in FIG. 4, and will be discussed in more detail below with respect to that figure.

After CPU 74 performs the watermarking algorithm on the image frame stored in memory 78, the image frame is returned to buffer 102. Image frames that have been watermarked are output from buffer 102 to analog converter 104. In a preferred embodiment, every image frame that passes through buffer 102 is watermarked, although any desired number or percentage of image frames may be watermarked.

Analog converter 104 converts received image frames into an analog NTSC signal, and then transmits the NTSC signal to a presentation device such as a television 66 which generates a display of the watermarked image frame(s) and/or a recording device 68 such as a video cassette recorder (VCR). The television 66 may alternatively be a digital television, in which case no digital to analog conversion is necessary.

Figure 4:
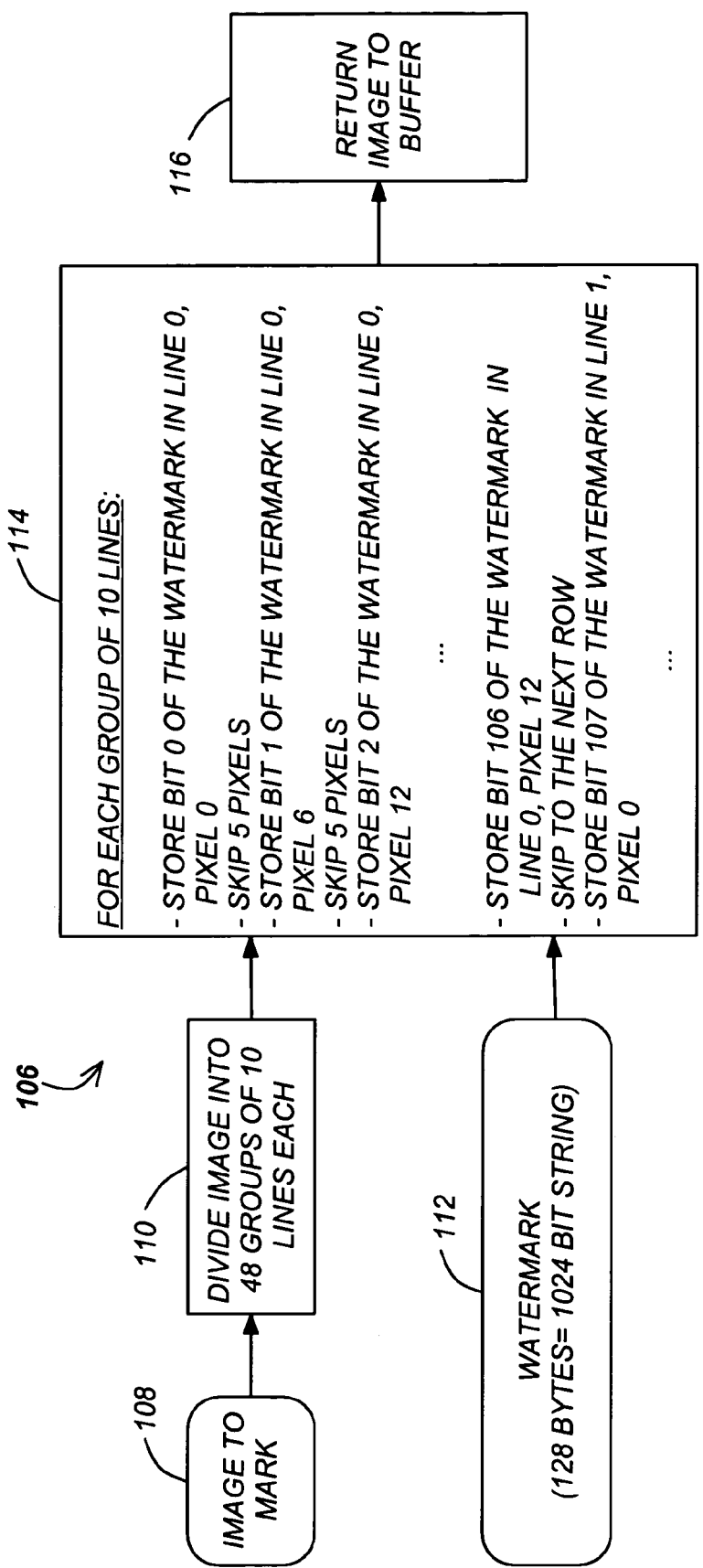
FIG. 4 is a flow diagram illustrating a preferred algorithm for watermarking received television content.

FIG. 4 shows watermarking algorithm 106, which illustrates a preferred method for inserting receiver identification data such as a receiver identification code into received television content. Watermarking algorithm 106 is performed on the image frames stored in buffer 102 (shown in FIG. 3). An image frame 108 that is to be watermarked is transferred from buffer 102 to memory 78 (block 108). Each image frame 108 consists of 480 lines, with 640 pixels per line. The color information for each pixel is preferably provided in a "Ycc" format, using 16 bits per pixel. For each pixel, 5 bits are used for hue data, 3 bits are used for saturation data and 8 bits are used for luminance data.

Image frame 108 is divided into 48 logical groups, with ten lines in each group (block 110). Image frames 108 are not actually divided into separate physical groups. Rather, the groupings are merely conceptual or abstract groupings.

The watermark to be inserted in an image frame 108 is represented by block 112. Preferably, each watermark 112 consists of 128 bytes, with 8 bits per byte (i.e., each watermark is a 1024 bit string). Watermark 112 represents any information that uniquely identifies receiver 64. In one embodiment, the information represented by the watermark 112 is globally unique, however, this need not be the case. Other information may be used to help resolve any ambiguities in the identity of the receiver 64. Hence, the information represented by the watermark 112 need only be sufficiently unique to allow the identification of the receiver 64, using any available information.

Watermark 112 may include, for example, the receiver serial number; an access card identifier that identifies access card 88; the name, address and/or phone number of the owner of receiver 64; the manufacturer or receiver 64; the model name of receiver 64, etc. In addition, any combination of the above-identifiers may be used as a watermark 112. CPU 74 obtains the identification data for a watermark 112 from memory 78 and/or access card 88. Watermark 112 also preferably includes a date/time stamp having date/time data. The date and time data is obtained, for example by CPU 74 from clock 76. Watermark 112 is not limited to 128 bytes, but rather may use more or less than 128 bytes. The alphanumeric data for a particular watermark 112 is preferably represented by a code, such as an ASCII code.

To facilitate later identification of the watermark 112 and to reduce errors in identification, multiple copies of a watermark 112 are preferably inserted into each image frame 108. The number of copies of a watermark 112 in a particular image frame 108 depends on the number of groups into which the image frame 108 is divided. For an image frame 108 that is divided into 48 groups, as shown in FIG. 4, the image frame 108 includes 48 copies of watermark 112. Each copy of a watermark 112 preferably includes identical information, although a watermark 112 containing different information may alternatively be inserted.

The insertion of watermark 112 into an image frame 108 is represented by block 114 in FIG. 4. As shown in block 114, a series of steps are taken for each of the 48 groups of 10 lines in image frame 108. Each of these steps is performed by CPU 74. The first step in inserting watermark 112 into image frame 108 is to store bit 0 of watermark 112 in line 0, pixel 0 of image frame 108. In a preferred embodiment, "storing" a bit means setting the low-order bit of the saturation value for that pixel to the desired bit value of watermark 112. If the low-order bit of the saturation value is already set to the desired value, it is not changed. Thus, the program content is modified by substitution of watermark information bits for a subset of the program content data, typically the lower-order bits of the program content data. Alternatively, watermark data may be inserted by modifying pixel data other than the saturation data, such as the hue data or luminance data. The chosen technique for inserting watermark data should not modify image frames 108 in such a way as to create changes in the appearance of the image frames that are visible to a casual observer.

The next step performed by CPU 74 is to skip 5 pixels in the current line (i.e., line 0). CPU 74 then stores bit 1 of watermark 112 in line 0, pixel 6 of image frame 108 (e.g., by changing the low-order bit of the saturation value for line 0, pixel 6 to the value of bit 1 of watermark 112). Again, 5 pixels are skipped. CPU 74 then stores bit 2 of watermark 112 in line 0, pixel 12 of image frame 108. This process is repeated for the first 106 bits of watermark 112. The 106$^{th}$ bit of watermark 112 is stored in line 0, pixel 636 of image frame 108. Since the end of the first row of image frame 108 has been reached at this point, CPU 74 skips to the next row (i.e., line 1), and repeats the process of storing watermark bits every 6 pixels.

Since a watermark 112 contains 1024 bits, and 106 bits are stored on each line of image frame 108, 10 lines of the image frame 108 are needed to store the complete watermark 112. A different number of lines and correspondingly a different number of groups will be used if a different pixel spacing is used (i.e., if watermark bits are inserted every 10 pixels rather than every 6 pixels), or if a different size watermark is used.

After the first copy of watermark 112 is stored in the first group of 10 lines, the process is repeated for the 47 other groups of 10 lines, resulting in a total of 48 copies of watermark 112 inserted into each image frame 108. In addition to reducing identification errors by inserting multiple copies of a watermark 112 into an image frame 108, other error reduction or detection methods may also be used. For example, checksum data may be embedded within an image frame 108 in the same manner as watermark data is embedded. After the copies of watermark 112 and any error correction data are inserted into a particular image frame 108, the image frame 108 is returned to buffer 102 (block 116).

Program guide images are watermarked using the same techniques as those for watermarking television content. Since program guide images are already stored in memory 78, no transfer of image frames from D/A converter 72 to memory 78 is necessary. Program guide images are manipulated in memory 78 in the same manner as video image frames to embed the watermarking information therein. The program guide images are then transferred from memory 78 to D/A converter 72 for analog conversion and transmission to television 66.

The watermark 112 inserted into image frames by each receiver 64 is unique to each receiver 64, because each receiver 64 includes unique identification information. The use of unique identification information allows images that were generated by a particular receiver to later be traced back to that receiver. The watermark information is obtained from a video image by essentially reversing the watermarking process shown in FIG. 4. Specifically, a video image frame 108 is digitally captured. Every sixth panel of every line of the video image is examined, and the low-order bit of the saturation data for the pixel is identified. The data obtained from each group of 10 lines of the video image frame 108 is compared to the data obtained from the other groups of lines. If the data obtained for each group of 10 lines is identical (or within an acceptable range), the video image frame 108 contains a watermark 112, and the obtained data represents the data of watermark 112. If on the other hand, there is little or no correlation between the data obtained for each group of lines, no watermark 112 is present in the video image frame 108, and the obtained data merely represents the original saturation values of the various pixels.

The information represented by a watermark 112 is preferably information that can not easily be modified by a user of receiver 64. For example, the watermark 112 should represent information "hard-wired" into receiver 64, such as by storing it in a ROM portion of memory 78 or access card 88. Alternatively, a watermark 112 may represent data that is downloaded by transmission station 26 to a particular receiver 64. For example, transmission station 26 occasionally downloads address information and other billing information to receivers 64. This downloaded information can then be used as the basis for a watermark 112. Using such hard-wiring and downloading techniques, rather than relying on information entered by a user, helps to ensure the accuracy of the information, and the accuracy of tracing a particular watermarked video image frame to a particular receiver 64.

A watermark 112 that has been embedded within an image frame 108 is preferably undetectable by the casual observer. Television content that includes a watermark 112 and that is displayed on television 66 appears the same to an observer as it would with no watermark 112 embedded therein.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

For example, although the application of the present invention has been described above with respect to a satellite broadcast system for purposes of illustration, the present invention is also operable with program material transmitted to receivers via terrestrial broadcasts cable networks, or the Internet.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A television system comprising:
   a receiver for receiving broadcast television content comprising multiple frames of data;
   means for inserting multiple copies of receiver identification data into data representing a frame of the television content; and means for generating a display of television images based upon the data representing the television content and the receiver identification data.

2. The television system of claim 1, wherein the receiver identification data includes at least one of a receiver serial number, a name of an owner of the receiver, an address of an owner of the receiver, a phone number of an owner of the receiver, a name of a manufacturer of the receiver and a model name of the receiver.

3. The television system of claim 1, wherein the receiver identification data includes a date stamp representing the date on which the receiver identification data was inserted into the data representing the television content.

4. The television system of claim 1, wherein the receiver identification data includes a time stamp representing the time at which the receiver identification data was inserted into the data representing the television content.

5. The television system of claim 1, further comprising a removable access card that stores television channel access data and billing data, and wherein the receiver identification data is obtained from the removable access card.

6. The television system of claim 1, wherein the receiver identification data is inserted into the data representing the television content by modifying saturation data of the television content.

7. The television system of claim 1, wherein the means for generating a display of television images generates a display of program guide images, and wherein the means for inserting inserts receiver identification data into data representing the program guide images prior to their display.

8. A method of modifying received television content comprising:
receiving broadcast television content comprising a plurality of frames of data with a receiver;
inserting multiple copies of receiver identification data into data representing a frame of the television content;
generating a display of television images based upon the data representing the television content and the receiver identification data; and
displaying on a display device the generated display of television images.

9. The method of claim 8, wherein the receiver identification data includes at least one of a receiver serial number, a name of an owner of the receiver, an address of an owner of the receiver, a phone number of an owner of the receiver, a name of a manufacturer of the receiver and a model name of the receiver.

10. The method of claim 8, wherein the receiver identification data includes a date stamp representing the date on which the receiver identification data was inserted into the data representing the television content.

11. The method of claim 8, wherein the receiver identification data includes a time stamp representing the time at which the receiver identification data was inserted into the data representing the television content.

12. The method of claim 8, wherein the receiver identification data is obtained from a removable access card that stores television channel access data and billing data.

13. The method of claim 8, wherein the receiver identification data is inserted into the data representing the television content by modifying saturation data of the television content.

14. The method of claim 8, and further comprising generating a display of program guide images, and inserting receiver identification data into data representing the program guide images prior to their display.

15. A receiver for receiving broadcast television content having multiple frames of data and inserting receiver identification data into generated images of television content in a manner that is undetectable to a casual observer of such images, the receiver comprising:
a tuner for receiving a plurality of television channels and outputting a first television channel;
a buffer coupled to the tuner for storing a first image frame from the first television channel, the first image frame including a multiplicity of pixel data;
a memory for storing identification data that provides a unique identification of the receiver;
a controller coupled to the buffer and the memory, the controller retrieving identification data from the memory and changing values of the pixel data to values of the identification data, the controller thereby embedding multiple copies of the identification data into the first image frame; and
a display generator for generating a display of the first television channel including the first image frame.

16. A method of receiving broadcast television content having multiple frames of data with a receiver and inserting receiver identification data into generated images of television content in a manner that is undetectable to a casual observer of such images, the method comprising:
receiving a plurality of television channels with a tuner and outputting a first television channel;
storing a first image frame from the first television channel, the first image frame including a multiplicity of pixel data;
storing identification data that provides a unique identification of the receiver;
modifying a subset of the pixel data to represent the multiple copies of the identification data, multiple copies of the identification data thereby being embedded into the first image frame;
generating a display of the first television channel including the first image frame; and
displaying the generated display on a display device.

17. A program reception system comprising:
a receiver for receiving transmitted data representing program content comprising multiple frames;
means for modifying a frame of the date representing the program content to include multiple copies of receiver identification data; and
means for providing the modified data representing the program content to a presentation device.

18. The apparatus of claim 17, wherein the receiver identification data is selected from the group comprising:
a receiver serial number;
a name of an owner of the receiver;
an address of an owner of the receiver;
a phone number of an owner of the receiver;
a name of a manufacturer of the receiver; and
a model name of the receiver.

19. The apparatus of claim 17, wherein the receiver identification data includes a date stamp representing a date on which the data representing the program content was modified to include the receiver identification data.

20. The apparatus of claim 17, wherein the receiver identification data includes a time stamp representing the time at which the data representing the program content was modified to include the receiver identification data.

21. The apparatus of claim 17, further comprising a removable access card that stores program channel access data and billing data, and wherein the receiver identification data is obtained from the removable access card.

22. The apparatus of claim 17, wherein the program content includes television content and the receiver identification data is inserted into the data representing the program content by modifying saturation data of the television content.

23. The apparatus of claim 17, wherein the means for providing the modified data representing the program content to a presentation device provides a display of at least one program guide image, and wherein the means for modifying the data representing the program content to include receiver identification data inserts receiver identification data into date representing the program guide image prior to display of the program guide image.

24. A method of modifying received program content comprising:
  receiving broadcast data representing program content having multiple frames;
  modifying a frame of the data representing the program content to include multiple copies of the receiver information data;
  providing the modified data representing the program content to a presentation device; and
  displaying the modified data on the presentation device.

25. The method of claim 24, wherein the step of modifying the data representing the program content to include receiver information data comprises the step of substituting receiver identification data for a subset of the data representing the program content.

26. The method of claim 24, further comprising the step of presenting the modified program content to the user on the presentation device.

27. The method of claim 24, wherein the receiver identification data is selected from the group comprising:
  a receiver serial number;
  a name of an owner of the receiver;
  an address of an owner of the receiver;
  a phone number of an owner of the receiver;
  a name of a manufacturer of the receiver; and
  a model name of the receiver.

28. The method of claim 24, wherein the receiver identification data includes a date stamp representing the date on which the receiver identification data was inserted into the data representing the program content.

29. The method of claim 24, wherein the receiver identification data includes a time stamp representing the time at which the receiver identification data was inserted into the data representing the program content.

30. The method of claim 24, wherein the receiver identification data is obtained from a removable access card that stores program channel access data and billing data.

31. The method of claim 24, wherein the program content comprises television content, and the receiver identification data is inserted into the data representing the program content by modifying saturation data of the television content.

32. The method of claim 24, further comprising the step of generating a display of program guide images, and inserting receiver identification data into data representing the program guide images prior to their display.

33. A receiver for receiving transmitted program content having multiple frames of data, comprising:
  a tuner, for receiving at least one of a plurality of program channels;
  a memory, communicatively coupled to the tuner for storing at least a portion of data representing the program content;
  a controller, communicatively coupled to the memory, the controller for modifying at least a portion of a frame of the data representing program content according to multiple copies of the receiver identification data.

34. The receiver of claim 33, wherein the program content comprises television content, the portion of data representing the program content comprises pixel data, and wherein:
  the controller modifies at least a portion of the pixel data according to the receiver identification data.

35. The receiver of claim 33, further comprising a second memory, communicatively coupled to the controller, for storing the identification data.

36. The receiver of claim 33, wherein the identification data is selected from the group comprising:
  a receiver serial number;
  a name of an owner of the receiver;
  an address of an owner of the receiver;
  a phone number of an owner of the receiver;
  a name of a manufacturer of the receiver; and
  a model name of the receiver.

37. The receiver of claim 33, wherein the receiver identification data includes date data representing a date on which the data representing the program content was modified to include the receiver identification data.

38. The receiver of claim 33, wherein the receiver identification data includes time data representing a time at which the data representing the program content was modified to include the receiver information data.

39. The receiver of claim 33, wherein the receiver identification data is obtained from an access card communicatively coupleable with the receiver.

40. A computer-readable medium encoded with a computer-executable method for modifying program content, said method comprising:
  receiving broadcast data representing program content having multiple frames;
  modifying a frame of the data representing the program content to include multiple copies of the receiver information data; and
  providing the modified data representing the program content to a presentation device.

41. The television system of claim 1, wherein the means for inserting multiple copies of receiver identification data into data representing a frame of the television content comprise:
  means for dividing the frame into a plurality of groups;
  means for inserting a copy of the receiver identification data in each of the plurality of groups.

42. The television system of claim 41, wherein the frame is an image frame, and each of the groups comprises a plurality of lines.

43. The television system of claim 42, wherein each line comprises a plurality of pixels, and the means for inserting a copy of the receiver identification data in each of the plurality of groups comprises:
  means for repeatedly substituting a bit of the receiver identification data for a bit of a pixel of the line and skipping a plurality of pixels, for each of the lines in the group.

44. The method of claim 8, wherein the step of inserting multiple copies of receiver identification data into data representing a frame of the television content comprises the steps of:
  dividing the frame into a plurality of groups; and
  inserting a copy of the receiver identification data in each of the plurality of groups.

45. The method of claim 44, wherein the frame is an image frame, and each of the groups comprises a plurality of lines.

46. The method of claim 45, wherein each line comprises a plurality of pixels, and the step of inserting a copy of the receiver identification data in each of the plurality of groups comprises the step of:
repeatedly substituting a bit of the receiver identification data for a bit of a pixel of the line and skipping a plurality of pixels for each of the lines in the group.

47. The receiver of claim 15, wherein the controller comprises:
means for dividing the first image frame into a plurality of groups;
means for inserting a copy of the receiver identification data in each of the plurality of groups.

48. The receiver of claim 47, wherein the first image frame comprises a plurality of lines, and each of the groups comprises a plurality of lines.

49. The receiver of claim 48, wherein each line comprises a plurality of pixels, and the means for inserting a copy of the receiver identification data in each of the plurality of groups comprises:
means for repeatedly substituting a bit of the identification data for a bit of a pixel of the line and skipping a plurality of pixels for each of the lines in the group.

50. The method of claim 16, wherein the step of modifying a subset of the pixel data to represent the multiple copies of the identification data comprises the steps of:
dividing the first image frame into a plurality of groups; and
inserting a copy of the identification data in each of the plurality of groups.

51. The method of claim 50, wherein each of the groups comprises a plurality of lines.

52. The method of claim 51, wherein each line comprises a plurality of pixels, and the step of inserting a copy of the identification data in each of the plurality of groups comprises the step of:
repeatedly substituting a bit of the identification data for a bit of a pixel of the line and skipping a plurality of pixels for each of the lines in the group.

53. The program reception system of claim 17, wherein the means for modifying the frame of the data representing the program content to include multiple copies of receiver identification data comprises:
means for dividing the frame into a plurality of groups;
means for inserting a copy of the receiver identification data in each of the plurality of groups.

54. The program reception system of claim 53, wherein the frame is an image frame comprising a plurality of lines, and each of the groups comprises a plurality of lines.

55. The program reception system of claim 54, wherein each line comprises a plurality of pixels, and the means for inserting a copy of the receiver identification data in each of the plurality of groups comprises:
means for repeatedly substituting a bit of the receiver identification data for a bit of a pixel of the line and skipping a plurality of pixels for each of the lines in the group.

56. The method of claim 24, wherein step of modifying the frame of the data representing the program content to include multiple copies of the receiver information data comprises the steps of:
dividing the frame into a plurality of groups;
inserting a copy of the receiver identification data in each of the plurality of groups.

57. The method of claim 56, wherein the frame is an image frame, and each of the groups comprises a plurality of lines.

58. The method of claim 57, wherein each line comprises a plurality of pixels, and the means for inserting a copy of the receiver identification data in each of the plurality of groups comprises:
means for repeatedly substituting a bit of the receiver identification for a bit of a pixel of the line and skipping a plurality of pixels for each of the lines in the group.

* * * * *